United States Patent [19]

Ohtaki et al.

[11] Patent Number: 4,646,915
[45] Date of Patent: Mar. 3, 1987

[54] WORKPIECE CONVEYING APPARATUS

[75] Inventors: Keizaburo Ohtaki, Hatoyama; Ryo Niikawa, Sayame, both of Japan

[73] Assignee: Honda Giken Kogyo Kabushiki Kaisha, Tokyo, Japan

[21] Appl. No.: 734,730

[22] Filed: May 16, 1985

[30] Foreign Application Priority Data

May 16, 1984 [JP] Japan ................................ 59-96394

[51] Int. Cl.$^4$ ............................................. B65G 47/00
[52] U.S. Cl. .................................... 198/345; 198/346; 198/463.3; 29/430
[58] Field of Search ............ 198/343, 345, 346, 346.2, 198/463.3, 468.6; 29/430, 33 K, 822, 823, 824; 414/222, 32, 626, 751, 752, 627, 753, 917

[56] References Cited

U.S. PATENT DOCUMENTS

| 3,429,466 | 2/1969 | Puderbach | 414/32 X |
| 4,440,090 | 4/1984 | Murai et al. | 198/803.01 X |

FOREIGN PATENT DOCUMENTS

| 2744446 | 4/1979 | Fed. Rep. of Germany | 414/32 |
| 5235379 | 3/1977 | Japan | 414/626 |
| 571104 | 1/1982 | Japan | 198/345 |
| 59-6177 | 1/1984 | Japan | |
| 747791 | 7/1980 | U.S.S.R. | 198/468.6 |
| 770969 | 10/1980 | U.S.S.R. | 414/626 |
| 1065322 | 1/1984 | U.S.S.R. | 198/346.2 |

Primary Examiner—Joseph E. Valenza
Assistant Examiner—Jonathan D. Holmes
Attorney, Agent, or Firm—Armstrong, Nikaido, Marmelstein & Kubovcik

[57] ABSTRACT

An apparatus moving a workpiece onto and off of a working station without stopping the conveying line or the conveying carrier. A loading carrier lifts the workpiece off the conveying carrier at a receiving station and transfers it to a jig table over the conveying line. After the operation at the working station is completed, an unloading carrier takes the workpiece off the jig table to a delivering position where it is set upon the empty conveying carrier which in the meantime had passed under the jig table.

4 Claims, 4 Drawing Figures

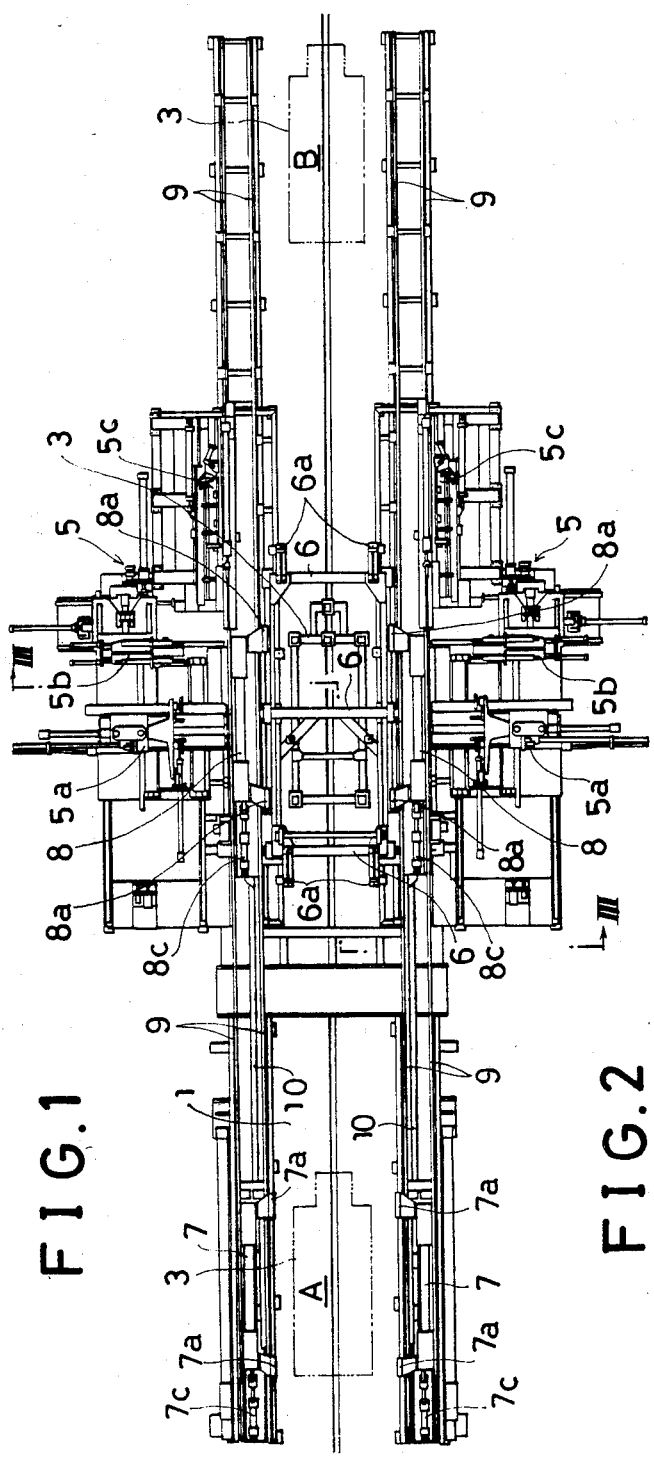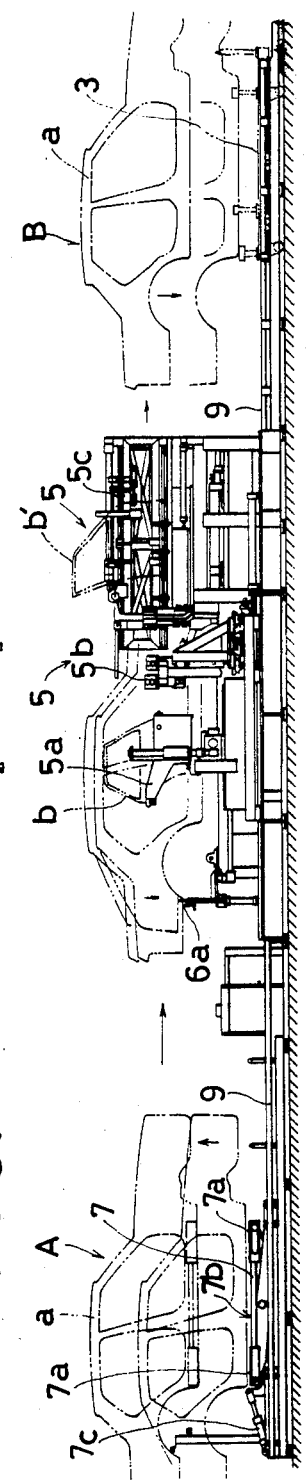

WORKPIECE CONVEYING APPARATUS

BACKGROUND OF THE INVENTION

This invention relates to a workpiece conveying apparatus wherein a workpiece such as a motorcar body or the like is conveyed along on a conveying line through a working station for an assembly procedure such as door assembling or the like provided in the middle of the conveying line.

In a usual workpiece conveying apparatus, the conveying member for conveying a workpiece such as a conveying carrier or the like stops at each working station for a predetermined work to be applied to the workpiece at that station. Such an arrangement has been hitherto known with this type apparatus that, in order that the travelling movement of the whole of the conveyor may not be stopped during the working on the workpiece, idle stations are provided at the front and the rear of the working station. A conveying distance corresponding to the working time may be gained or compensated by disconnecting the conveying member from the whole of the conveyor, giving the conveying member a quick feeding at each of the idle stations, and reconnecting the conveying member to the conveyor. This arrangement, however, is inconvenient in that the feeding mechanism for the conveying member is divided to separate at each idle station and becomes complicated in construction.

OBJECT AND SUMMARY OF THE INVENTION

The present invention has as an object, the elimination of the inconvenience mentioned above, that is, the elimination of the need for dividing the feeding mechanism for the conveying member and necessary complicated construction thereof.

This invention can enable the working at the working station to be carried out without stopping the flowing movement of the whole of the conveyor including the conveying member even though no idle station is provided.

The above object is obtained in a workpiece conveying apparatus for use with a conveying line having conveying members moving therealong through a working station for performing an operation on the workpiece. A jig table at the working station extends laterally across the conveying line and is adapted to support the workpiece during the performing of the operation. The jig table has sufficient clearance in a lower space under the jig table for the conveying member to pass thereunder. A loading carrier and an unloading carrier which are interconnected in front and rear relationship are disposed on each end of the conveying line so as to be movable to reciprocate between the working station and their respective front and rear stations. Each of the carriers on each side is provided with a workpiece receiving means movable upwards and downwards so that a workpiece loaded on the conveying member moving along the conveying line may be supported, at a predetermined receiving position in front of the working station, by the workpiece receiving means of the loading carrier and conveyed to and set on the jig table, and, in the meanwhile, a workpiece on the jig table having the working operation completed thereon may be supported by the workpiece receiving means of the unloading carrier and conveyed to a predetermined receiving position beyond the working station and be put on the conveying member in an empty condition which has already travelled through the lower space under the jig table to the rear portion thereof.

BRIEF DESCRIPTION OF THE DRAWINGS

The above and other objects and the attendant advantages of the present invention will become readily apparent by reference to the following detailed description in consideration and in conjunction with the accompanying drawings wherein:

FIG. 1 is a top plan view of one embodiment of this invention;

FIG. 2 is a side view thereof;

DETAILED DESCRIPTION OF THE PREFERRED EMBODIMENT

Figure 3:
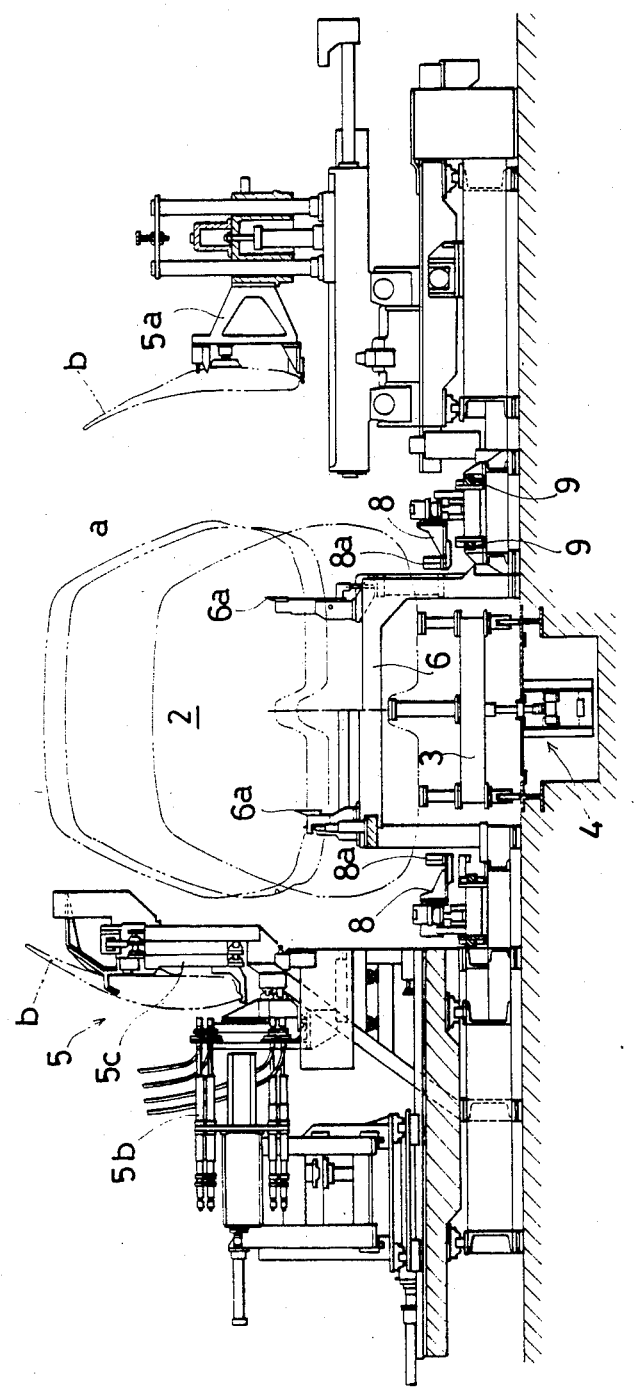
FIG. 3 is a sectional view thereof taken along the line III—III in FIG. 1.

One embodiment of this invention applied to the assembling of a vehicle door with a vehicle body will be explained with reference to the accompanying drawings:

Referring to the drawings, a conveying line 1 for a vehicle body a, that is, a workpiece, is provided with a working station 2 in the middle of the line 1. A plurality of conveying carriers 3, 3, . . . , that is, conveying members for conveying a workpiece are disposed with proper intervals therebetween on the conveying line 1 and are arranged to be moved by a trolley-type feeding mechanism 4. On such an apparatus, the vehicle body a conveyed by each carrier 3 may be assembled at the working station 2 with a door b through a door assembling means 5 provided on each outside of the working station 2. The door assembling means 5 includes a door set jig 5a, a door fastening head 5b, and a door introducing means 5c for introducing a door b into the door set jig 5a for setting the same thereon.

According to the characteristic features of this invention, a jig table 6 having various kinds of positioning members 6a, 6a, . . . for setting a workpiece is provided at the working station 2 and extends across over the conveying line 1 so that each conveying carrier 3 may move through a lower space under the jig table 6 from the front portion of the jig table 6 to the rearward portion thereof.

A jig table loading carrier 7 and a jig table unloading carrier 8 which are interconnected in front and rear relationship are disposed on each side of the conveying line 1 so as to be movable to reciprocate between the working station 2 and respective front and rear positions thereof. A pair of front and rear receiving members 7a, 7a for supporting the vehicle body a from below at side portions of a lower surface thereof are provided on the loading carrier 7 so as to be movable upwards and downwards to lift the vehicle body a off of the conveying carrier 3 and to set it on the jig table 6. Similarly a pair of front and rear receiving members 8a, 8a for supporting the vehicle body a from below at side portions of a lower surface thereof are provided on the unloading carrier 8 so as to be movable upwards and downwards to lift the vehicle body a with door b off of the jig table 6 and to set it back onto the same conveying carrier 3.

Figure 4:
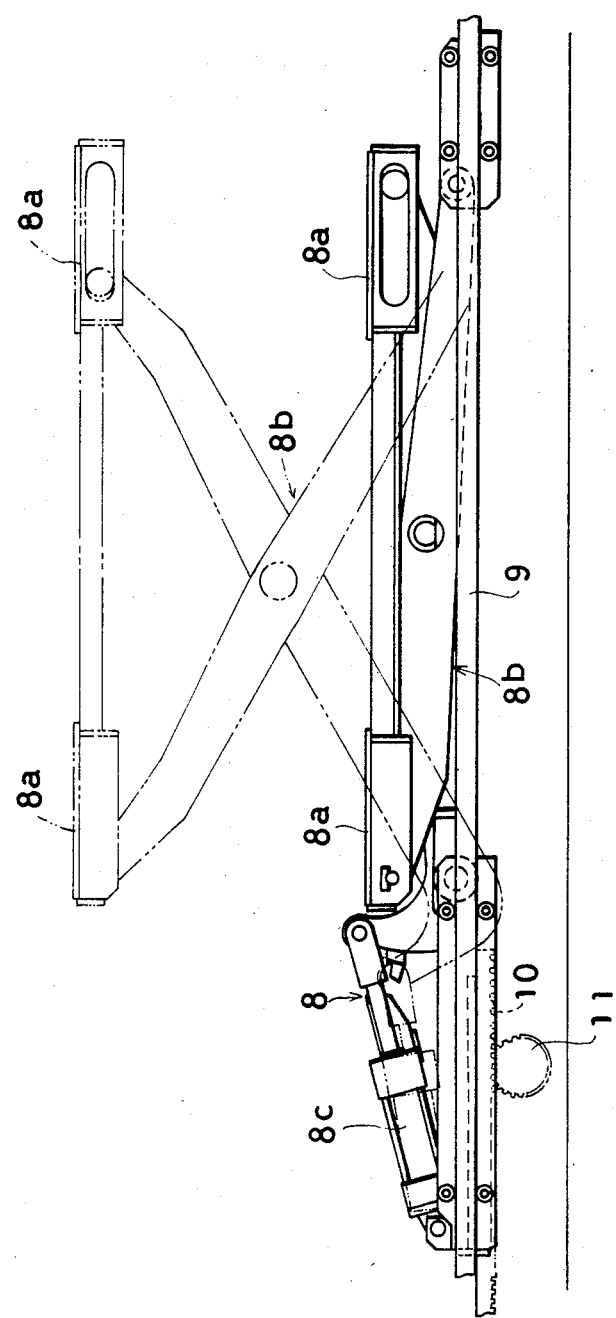
FIG. 4 is a side view on a larger scale of a detail of the apparatus.

More in detail, the loading carrier 7 and the unloading carrier 8 are disposed at a proper interval therebetween in front and rear directions of the working station 2. A pair of inner and outer rails 9, 9 are disposed on each side of the conveying line 1 and extend between a predetermined receiving position A in front of the working station 2 and a predetermined delivering position B in rear of the working station 2. The two carriers 7, 8 on each side ride on the pair of inner and outer rails 9, 9 and are interconnected through a rack 10 extending therebetween. The turning, in either direction, of a pinion 11 meshed with the rack 10 as shown in FIG. 4 reciprocates the loading carrier 7 between the receiving position A and the working station 2, and, at the same time, reciprocates the unloading carrier 8 between the working station 2 and the delivering station B. The carriers 7, 8 are provided with respective X-shaped link type lift mechanisms 7b, 8b. The foregoing receiving members 7a, 7a, 8a, 8a are supported on the respective lift mechanisms 7b, 8b, so that those receiving members 7a, 7a, 8a, 8a may be moved upwards and downwards by respective operation cylinders 7c, 8c for the respective lift mechanisms 7b, 8b.

A controller (not shown) is provided for timing and operating the operation cylinders 7c, 8c and for rotating the pinion 11 in the appropriate direction and at an appropriate speed. Any person skilled in the art could devise the controller as an electro-hydraulic system, a hydraulic system, and/or a combined hydraulic, electric, and mechanical system perhaps controlled by a computer as long as it can carry out the operations disclosed below.

Next, the operation of the foregoing apparatus will be explained as follows:

First, the loading carriers 7, 7 on the right and the left are positioned to wait for a conveying member at the receiving position A. When the conveying member 3 arrives at the position A, the workpiece receiving members 7a, 7a of the loading carrier 7 on each side are elevated. The vehicle body a on the conveying carrier 3 is supported on the workpiece receiving members 7a, 7a on each side and is lifted off of the carrier 3. The loading carrier 7 is moved rapidly to the working station 2 by rotation of the pinion 11. The vehicle body a is then transferred and set onto the jig table 6. The vehicle body a is assembled with the door b at the working station 2. During this assembling by reverse rotation of the pinion 11, the loading carriers 7, 7 are returned to the receiving position A for being ready to await the next conveying member at that position, and in conjunction therewith the unloading carriers 8, 8 on the right and the left are moved to the working station 2 for waiting.

During this operation, the travelling speed of the loading carrier 7 on each side is set to be higher than the travelling speed of the conveying carrier 3. An interval between the adjacent conveying carriers 3, 3 is set to be a proper amount so that, at the time of completion of the assembling, the next conveying carrier 3 arrives at the receiving position A. Thus, after the completion of the assembling, the workpiece receiving members 8a, 8a of the unloading carrier 8 on each side are elevated so that the vehicle body a finished with the assembling work on the jig table 6 is supported on the receiving members 8, 8, and lifted off of the jig table 6. At the same time, the receiving members 7a, 7a of the loading carrier 7 on each side are elevated so that the next vehicle body a on the next conveying carrier 3 is supported on those receiving members 7a, 7a and lifted off of that carrier 3. Under this condition, the loading carriers 7, 7 carrying the next vehicle body are moved to the working station 2, and the unloading carriers 8, 8, carrying the finished vehicle body a are moved to the delivering position B. The next vehicle body a is transferred to and set onto the jig table 6, and the finished vehicle body a is lowered and put onto the initial, empty conveying carrier 3 which has travelled through the lower space under the jig table 6, during the time when the vehicle body a is transferred on the loading carriers 7, 7, is subjected to the assembling and is transferred on the unloading carriers 8, 8. Thereafter, the foregoing operations are repeated in succession. Thereby assembly of the door b to the vehicle body a can be carried out continuously in succession without stopping the moving of the conveying carrier 3.

Thus, according to this invention, the workpiece set on the conveying member moving along on the conveying line may be conveyed from the receiving position in front of the working station, in order to be transferred to and set onto the jig table provided on the working station, by means of the loading carrier having the workpiece receiving means movable upwards and downwards, and in the meanwhile, the workpiece finished with the working operation on the jig table may be conveyed for being transferred onto the conveying carrier in an empty condition, which has travelled through the lower space under the jig table, at the delivering position in the rear of the working station, by means of the unloading carrier having the workpiece receiving means which is movable upwards and downwards. In this manner, the workpiece can be conveyed, while subjected to the predetermined working at the working station, without providing an idle station and without stopping the moving of the conveying member. Thus, the feeding mechanism for the conveying members can be united with the whole length of the conveying line, and may be simple in construction.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A workpiece conveying apparatus for use with a conveying line having conveying members moving therealong through a working station for performing an operation on the workpiece comprising,
   a jig table at the working station extending laterally across the conveying line and being adapted to stationarily support the workpiece during the performing of the operation, said jig table having sufficient clearance thereunder for the conveying member to pass thereunder,
   a loading carrier reciprocatingly movable between a receiving position in front of the working station along the conveying line and the jig table,
   an unloading carrier reciprocatingly movable between the jig table and a delivering position beyond the working station along the conveying line,
   means interconnecting the loading carrier and the unloading carrier for reciprocating them simultaneously between the receiving position and the jig table and the jig table and the delivering position, respectively, each of the loading carrier and the unloading carrier having workpiece receiving means for receiving a workpiece to be moved, each workpiece receiving means being movable up and down and having vertical moving means, for raising and lowering a workpiece supported thereon, whereby a workpiece loaded on one conveying member can be lifted off of the conveying member at the receiving position by the loading carrier and transferred to and set onto the jig table at the same time as a workpiece on the jig table having had the operation completed thereon can be lifted off of the jig table by the unloading carrier and transferred to the delivering position and set upon the empty conveying member which has continued to travel along the conveying line under the jig table while the operation was being performed.

2. An apparatus as claimed in claim 1, wherein the vertical moving means includes respective X-shaped link type lift mechanisms, and operation cylinders operatively associated therewith, and the respective workpiece receiving means are provided on the respective lift mechanisms so that the receiving means may be moved upwards and downwards by the respective operation cylinders for the respective lift mechanisms.

3. An apparatus as claimed in claim 1, further comprising rails positioned on a floor portion on opposite lateral sides of said conveying line extending longitudinally thereof, said unloading carrier and said loading carrier riding on said rails, and wherein said workpiece receiving means on said loading carrier and said unloading carrier each include means for supporting the workpiece at both side portions of a bottom surface thereof.

4. An apparatus as claimed in claim 1, wherein said means interconnecting the loading carrier and the unloading carrier for reciprocating them simultanesouly comprises a rack interconnecting said carriers and extending therebetween and a pinion driving said rack to reciprocate the rack and the carriers.

* * * * *